United States Patent
Kulkarni

(10) Patent No.: US 9,372,129 B2
(45) Date of Patent: Jun. 21, 2016

(54) PRESSURE AND FLOW DETECTION SENSOR INCLUDING A CARBON-BASED ELEMENT

(71) Applicant: Quarkonics Applied Research Corporation, Detroit, MI (US)

(72) Inventor: Nagesh P. Kulkarni, Troy, MI (US)

(73) Assignee: Quarkonics Applied Research Corporation, Detroit, MI (US)

( * ) Notice: Subject to any disclaimer, the term of this patent is extended or adjusted under 35 U.S.C. 154(b) by 170 days.

(21) Appl. No.: 14/315,664

(22) Filed: Jun. 26, 2014

(65) Prior Publication Data

US 2015/0377663 A1 Dec. 31, 2015

(51) Int. Cl.
| | |
|---|---|
| *G01F 1/56* | (2006.01) |
| *G01L 9/00* | (2006.01) |
| *G01F 1/00* | (2006.01) |
| *G01F 1/34* | (2006.01) |

(52) U.S. Cl.
CPC .............. *G01L 9/0041* (2013.01); *G01F 1/002* (2013.01); *G01F 1/34* (2013.01)

(58) Field of Classification Search
CPC .............. B05D 5/12; B32B 3/00; B32B 9/00; G03F 1/00
USPC ...................... 427/58; 428/210, 695; 430/324
See application file for complete search history.

(56) References Cited

U.S. PATENT DOCUMENTS

| | | | | |
|---|---|---|---|---|
| 3,912,538 | A * | 10/1975 | Dews ...................... | H01M 4/96 429/530 |
| 4,293,396 | A * | 10/1981 | Allen ..................... | C25B 11/035 205/343 |
| 5,599,654 | A * | 2/1997 | Kudo .................... | G03F 7/0046 430/296 |
| 5,660,681 | A * | 8/1997 | Fukuda ............. | H01L 21/32137 216/46 |
| 5,807,626 | A * | 9/1998 | Naba .................... | B23K 1/0016 174/259 |
| 7,687,102 | B2 * | 3/2010 | Hossick-Schott ...... | H01G 9/155 427/58 |
| 2008/0164142 | A1* | 7/2008 | Alvarez-Icaza .... | G01N 27/3272 204/164 |
| 2013/0270511 | A1 | 10/2013 | Cai et al. | |

OTHER PUBLICATIONS

Dhiman, Yavari, Mi, Gullapalli, Shi, Ajayan and Koratkar; Harvesting Energy from Water Flow over Graphene; NANO Letters; Jul. 12, 2011; 5 pages.
Reddy, Srivastava, Gowda, Gullapalli, Dubey and Ajayan; Sysnthesis of Nitrogen-Doped Graphene Films for Lithium Battery Application; www.ACSNANO.org; Oct. 8, 2010; 6 pages.
Ghosh, Sood and Kumar; Carbon Nanotube Flow Sensors; www.sciencemag.org; Feb. 14, 2003; vol. 299; 3 pages.

* cited by examiner

*Primary Examiner* — Jewel V Thompson
(74) *Attorney, Agent, or Firm* — Reising Ethington P.C.

(57) ABSTRACT

A sensor using a carbon-based element for measuring a flow or a pressure in an environment includes: a substrate; a carbon-based element; and one or more electrodes electrically communicating with the carbon based element, wherein the electrodes are located between the substrate and the carbon-based element so that the electrodes are not exposed to the environment.

14 Claims, 4 Drawing Sheets

PRESSURE AND FLOW DETECTION SENSOR INCLUDING A CARBON-BASED ELEMENT

TECHNICAL FIELD

The present invention relates to sensors and, more particularly, to sensors using carbon-based material to detect pressure and flow rate of material.

BACKGROUND

Sensors using carbon-based elements can be used to detect the flow or pressure of a liquid. For example, a sensor using carbon nanotubes can be exposed to water. When water flows across the surface of the nanotubes, the flow induces a flow of current in the direction the water flows. In addition, a sensor using a carbon-based membrane suspended over a cavity in a substrate can be used to sense the pressure of gasses or liquids that contact the membrane. Typically, sensors using carbon-based elements are constructed using a substrate, a carbon-based element, such as carbon nanotubes, and two electrodes located on the outer edges of the carbon-based element. In use, the carbon-based element and the electrodes are immersed in the liquid or gas that will be monitored. However, sensors using carbon-based elements may not be useful for many applications. The carbon-based elements and electrodes of these sensors are fragile when used in demanding conditions. Yet in order to measure flow or pressure, the sensors expose the carbon-based element to the material to be monitored. And when the sensors using carbon-based elements are exposed to environments in which solids exist and/or include significant amounts of heat/cold, the sensors may not operate reliably.

SUMMARY

According to an embodiment of the invention, a sensor uses a carbon-based element for measuring a flow or a pressure in an environment. The sensor includes a substrate; a carbon-based element; and one or more electrodes electrically communicating with the carbon based element, wherein the electrodes are located between the substrate and the carbon-based element so that the electrodes are not exposed to the environment.

According to another embodiment of the invention, a sensor uses a carbon-based element for measuring a flow or a pressure in an environment. The sensor includes a substrate; a carbon-based element; one or more electrodes electrically communicating with the carbon-based element, wherein the electrodes are located between the substrate and the carbon-based element; and a nanoparticle layer having hydrophobic or oil-phobic properties, wherein the nanoparticle layer separates the carbon-based element from the environment.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION OF THE ILLUSTRATED EMBODIMENTS

Figure 1:
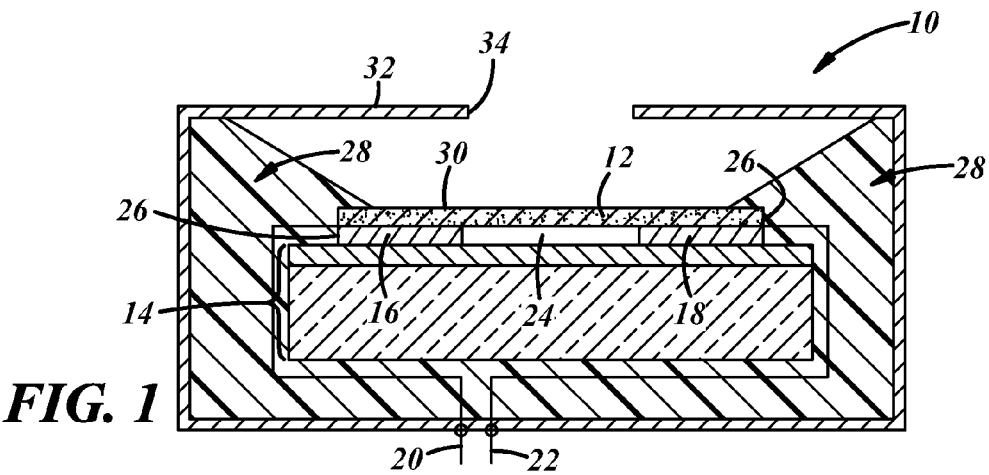
FIG. 1 is a cross-sectional view of an exemplary embodiment of a sensor using a carbon-based element.

The sensors described below use a carbon-based element capable of measuring the pressure and the flow of solids, liquids, and gases in a demanding environment. Generally speaking, the sensors can use the carbon-based element as an electro-mechanical membrane to sense the pressure and/or flow of a material that contacts the membrane. The carbon-based element can be linked to a substrate via one or more electrodes and/or electrical leads that also communicate current, voltage potential, and/or resistance across the carbon-based element to a device capable of measuring the current or voltage, such as an electronics assembly that includes a microprocessor or microcontroller. As the rate of flow of material (i.e., solid, liquid, gas, or any combination of materials in these phases) across the carbon-based element increases, so too does the flow of electrical current across the carbon-based element. Thus, the rate of flow across the carbon-based element may be proportional to the current flow across the carbon-based element. Furthermore, the carbon-based element can also indicate the direction in which the material is flowing as the electrical current may flow in the same direction as the material detected. Apart from the flow of material, the pressure the material exerts on the carbon-based element can also be detected when configured with the proper polarities of the battery. As the pressure exerted by the material on the carbon-based element increases, the electrical resistance of the carbon-based element changes in proportion to the amount of pressure.

Some environments may render sensors using carbon-based elements inoperable or unreliable. These environments can involve significant temperature extremes that, in one example, range from −50° C. to 300° C. and can be located thousands of feet below the surface of the earth. As a result, ensuring the robustness and reliability of the sensors is helpful because extracting the sensors from demanding environments can be challenging. For example, natural resource exploration and collection can involve drilling through a heterogeneous mixture of material found in the earth existing in a solid, liquid, and/or gaseous state before the natural resources are reached. A cutting head attached to a rotating shaft can bore a cylinder or well into the earth toward a source of natural resources, such as natural gas or oil. As drilling proceeds, the material displaced during cutting operations can be evacuated from behind the cutting head using a synthetic fluid. The synthetic fluid can be introduced to the cylinder or well under pressure via an input located behind the cutting head and mix with the displaced material. After mixing with the displaced material, the synthetic fluid can be evacuated from the cylinder or well along with the displaced material via an outlet. Sensors using carbon-based elements can be used to monitor the pressure of the synthetic fluid and displaced material as well as a flow rate of the synthetic material entering and/or leaving the well.

In the past, sensors that use a carbon-based element include sensor components that may be exposed to the environment they monitor in a way that those sensor components would be damaged if used in demanding environments, such as the drilling example discussed above. In one example, past sensors using carbon-based elements have been designed to expose electrodes to the environment being sensed, which in demanding environments can result in electrodes that separate or break away from the carbon-based element rendering the sensor inoperable. In another example, past sensors using carbon-based elements have been implemented using fragile carbon-based elements that may not withstand the abuse received when exposed to a demanding environment.

The sensors using carbon-based elements disclosed herein protect sensor components from exposure to the environment being monitored. For instance, sensors using carbon-based elements can locate the electrodes in between a carbon-based element and a substrate. A potting material, such as epoxy, can seal the electrodes in situ between the carbon-based element and the substrate such that only a portion of the carbon-based element of the sensor is exposed to the environment that is monitored. The carbon-based element, the electrodes, the substrate, and the potting material can be encased in a casing made from a rigid material, such as aluminum.

Other embodiments of sensors using carbon-based elements that protect sensor components are also possible. In one implementation, the electrodes of the sensor can be placed on a substrate and a carbon-based element can be attached to the electrodes so that the element covers the electrodes when the substrate is seen from a plan view perspective. A hydrophilic and/or oil-phobic coating can then be applied over the carbon-based element and the substrate so that the coating seals the element and the electrodes from the environment being monitored. In this embodiment, the carbon-based element may not directly come in contact with the environment being monitored but be separated by the coating. Nonetheless, the sensor using the carbon-based element can still monitor pressure and/or flow. The sensor using the carbon-based sensor can be calibrated to adapt to changes in current and/or voltage potential generated by the carbon-based element that may be caused by the coating. In one example, this can be carried out by immersing the carbon-based element without the coating into a two-foot deep column of water and recording the change in current measured by the sensor. For instance, the resistance of the carbon-based element without coating changed from 6.840Ω to 8.343Ω when the element was submerged in a 2 feet deep water column. This change in resistance can indicate the pressure exerted on the carbon-based element by the water. A coating can be applied to the same carbon-based element and then the coated carbon-based element can be placed in the column of water. The difference in current output from the sensor with the coating from the sensor without the coating can be used to account for the sensor coating.

Turning to FIG. 1, a cross-sectional view is shown of an exemplary sensor 10 using a carbon-based element 12. The sensor 10 also includes a substrate 14 to which the carbon-based element 12 is attached via a first electrode 16 and a second electrode 18. The first electrode 16 and the second electrode 18 can be electrically connected via a first electrical lead 20 and a second electrical lead 22 to a microprocessor or microcontroller (not shown) that is capable of receiving or detecting changes in voltage and current occurring across the carbon-based element 12. In such an arrangement, the sensor 10 can include a cavity 24 that is created between the carbon-based element 12, the substrate 14, the first electrode 16, and the second electrode 18.

The carbon-based element 12 can be implemented using a variety of materials. For instance, the carbon-based element 12 can be made from carbon nanotubes, graphene sheets, or combinations of boron, carbon, and nitrogen (i.e., Boron Nitride) to name a few examples. The carbon-based element 12 can be substantially planar and physically attached to the substrate 14 via the first and second electrodes 16, 18. In one example, the first electrode 16 and the second electrode 18 can be formed from conductive elements such as copper or gold and chemically bonded to the carbon-based element 12 and the substrate 14. In one implementation, the first electrode 16 and the second electrode 18 should be no more than 10 nanometers (nm) in height and/or spaced 10 nm apart. As a result, the cavity 24 that exists between the carbon-based element, the first electrode 16, and the second electrode 18 is relatively small in volume. The substrate 14 can be an insulator through which the first electrical lead 20 and the second electrical lead 22 can pass and electrically communicate with the first electrode 16 and the second electrode 18, respectively.

Side surfaces 26 of the first electrode 16 and the second electrode 18 can then be encapsulated in a potting compound 28 along with at least a portion of the substrate 14 and at least a portion of the carbon-based element 12 as is shown by the shaded area in FIG. 1. In one implementation, the potting compound 28 can be implemented using an epoxy-based slurry that is applied to the carbon-based element 12, the substrate 14, the first electrode 16, and the second electrode 18 in a semi-liquid form. Later, the epoxy-based slurry can harden or cure into a solid material that is resilient to the demanding environments discussed above. In another implementation, the potting compound 28 comprise a metal-based material that is insulated from the first electrode 16, the second electrode 18, the first electrical lead 20, and the second electrical lead 22. The potting compound 28 can seal the previously-exposed surfaces of the first electrode 16 and the second electrode 18 from the environment to be monitored. In some arrangements, the first electrical lead 20, the second electrical lead 22, and a portion of the carbon-based element 12 may also be covered by the potting compound 28. However, while the potting compound 26 may substantially surround all of the components of the sensor 10, the compound 28 may not cover an outside surface 30 of the carbon-based element 12. The outside surface 30 of the carbon-based element 12 can ultimately come in contact with the environment that is monitored by the sensor 10. The outside surface 30 that is exposed to the environment will likely be very small such that in one embodiment the area exposed is no more than 25 square micrometers (μm). A rigid casing 32 can surround the components identified above and provide an aperture 34 or opening in the casing 32 through which the environment can pass and contact the outside surface 30. In one embodiment, the rigid casing 32 can be constructed from aluminum but other materials could be used instead.

Figure 2:
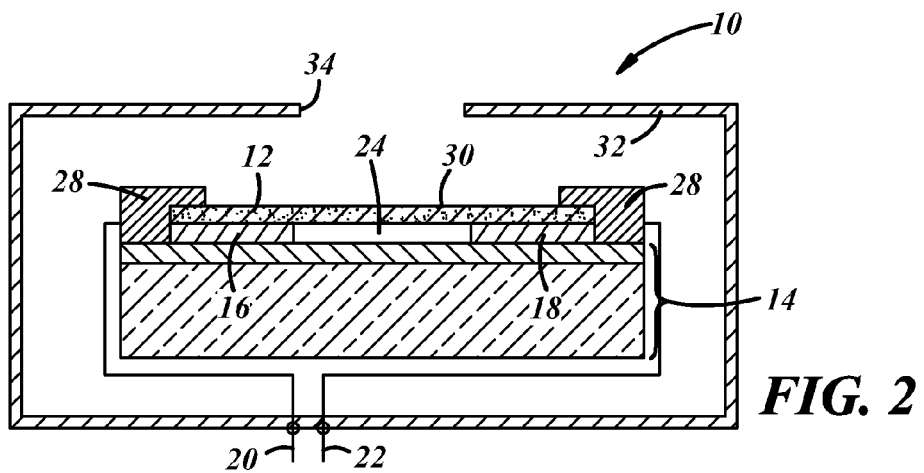
FIG. 2 is a cross-sectional view of another exemplary embodiment of a sensor using a carbon-based element.
Figure 3:
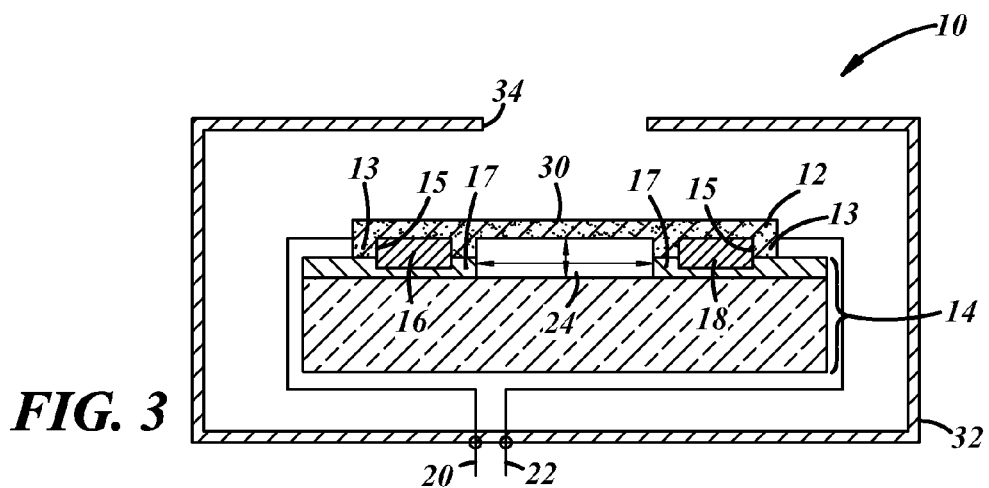
FIG. 3 is a cross-sectional view of another exemplary embodiment of a sensor using a carbon-based element.

FIGS. 2-3 depict cross-sectional views of other implementations of the sensor 10 using a carbon-based element 12. In FIG. 2, the sensor 10 includes the carbon-based element 12, the substrate 14, the first electrode 16, the second electrode 18, the first electrical lead 20, the second electrical lead 22, and the cavity 24 as is described above with respect to FIG. 1. In this embodiment, the size of the potting compound 28 may be defined on one side by outer edges of the substrate 14, on another side by the carbon-based element 12, the first electrode 16, and the second electrode 18, and on yet another side by the outside surface 30 that is exposed to the environment. Turning to FIG. 3, an implementation of the sensor 10 is shown without the potting compound 28. In this arrangement, the carbon-based element 12 can include hooked ends 13 that contact both the substrate 14 and outside surfaces 15 of the first electrode 16 and the second electrode 18 from the environment. The substrate 14 can also include hooked ends 17 that contact both the first electrode 16 and the second electrode 18 as well as the carbon-based element 12. This arrangement can serve to protect the first electrode 16 and the second electrode 18 from the environment in which the sensor 10 is deployed.

Figure 4:
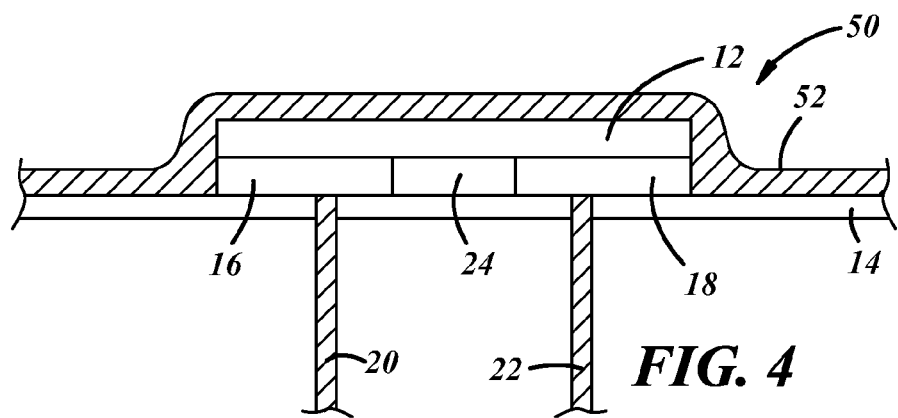
FIG. 4 is a cross-sectional view of another exemplary embodiment of a sensor using a carbon-based element.

Turning to FIG. 4, a cross-sectional view is shown of an exemplary sensor 50 using a carbon-based element 12. The sensor 50 includes the carbon-based element 12, the substrate 14, the first electrode 16, the second electrode 18, the first electrical lead 20, the second electrical lead 22, and the cavity 24 as is described above with respect to FIG. 1. However, the sensor 50 lacks the potting compound described above. Instead, the carbon-based element 12, the first electrode 16, the second electrode 18, and at least part of the substrate 14 can be sealed by a nanoparticle layer 52 that has hydrophobic or oil phobic properties to separate these elements from the environment being monitored. In one embodiment, the nanoparticle layer 52 applied can comprise a titanium oxide ($TiO_2$) layer. In this implementation, the carbon-based element 12 may not come in contact with the material being monitored. However, in other implementations, it is possible to leave a portion of the carbon-based element 12 exposed to the environment being monitored.

Figure 5:
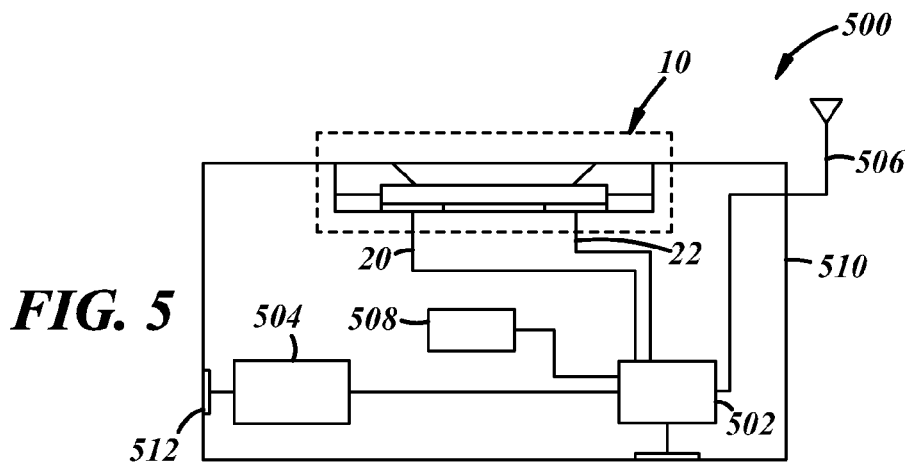
FIG. 5 is a block diagram of an exemplary embodiment of a monitoring device incorporating a sensor using a carbon-based element.

Turning to FIG. 5, a block diagram is shown of an exemplary monitoring device 500 incorporating a sensor using a carbon-based element. The monitoring device 500 could be used with the sensor 10 or the sensor 50 described above with equal success. However, for purposes of illustration, the monitoring device 500 will be described with respect to the sensor 10 shown in FIG. 1.

The monitoring device 500 is a unit that can remotely gather information from an environment and communicate the information to a user. In one implementation, the monitoring device 500 can be placed in a location, such as a well, where the device 500 monitors the environment and wirelessly transmits data reflecting that monitoring to the user. The data can be transmitted via short-range wireless protocols, such as those defined by the protocols in IEEE 802.11. In that sense, the user could be located locally and the data gathered by the monitoring device 500 can then be communicated wirelessly between the device 500 and the user via a short-range wireless link. The user can receive this data over the short-range wireless link via computing devices capable of short-range wireless communications, such as personal computers (PCs) or handheld wireless devices (i.e., smartphones/tablets), to provide but a few examples. However, it is also possible to include a cellular transceiver or cellular chipset with the monitoring device 500 that can wirelessly transmit data between the device 500 and a remote facility using a cellular carrier system via one or more cell towers. The user could be located at the remote facility and receive the data transmitted from the monitoring device 500 via a cellular carrier system. In another embodiment, the monitoring device 500 can be constructed without an antenna whereby the device monitors the environment and stores data related to the monitoring in a memory device—either integral to a microprocessor or separate from the microprocessor. The user can access the stored data via a wireless or wired connection at a later time.

The monitoring device 500 can include the sensor 10 and electrically communicate with a microcontroller 502. The microprocessor 502 can detect changes in or amounts of voltage and/or current at the sensor 10 measured across the first electrical lead 20 and the second electrical lead 22 shown both here and in FIG. 1. These changes can be translated to data processed by the microcontroller 502 and capable of storage as discrete data. The microcontroller 502 can include a number of elements, such as a microprocessor, an amplifier, and an analog-digital converter. The microcontroller 502 of the monitoring device 500 can be powered by a battery 504 and in some implementations the device 500 includes an antenna 506 and/or a memory device 508 external to the microcontroller 502. The antenna 506 can be configured to implement short-range wireless communications technologies or protocols, cellular communication technologies or protocols, or both. When data is gathered from the sensor 10 by the microcontroller 502, the data can be wirelessly streamed in real time to the user via the antenna 506. It is possible that the battery 504 can be electrically linked via a port 512 to a source of electricity so that the battery 504 can be periodically recharged using the source of electricity. The components of the monitoring device 500 can be protected by a rugged housing 510 that surrounds the microcontroller 502, the power source 504, and the external memory device 508. While the antenna 506 in FIG. 3 is shown to be located outside of the housing 510, some implementations can mount the antenna 506 within the housing 510.

Figure 6:
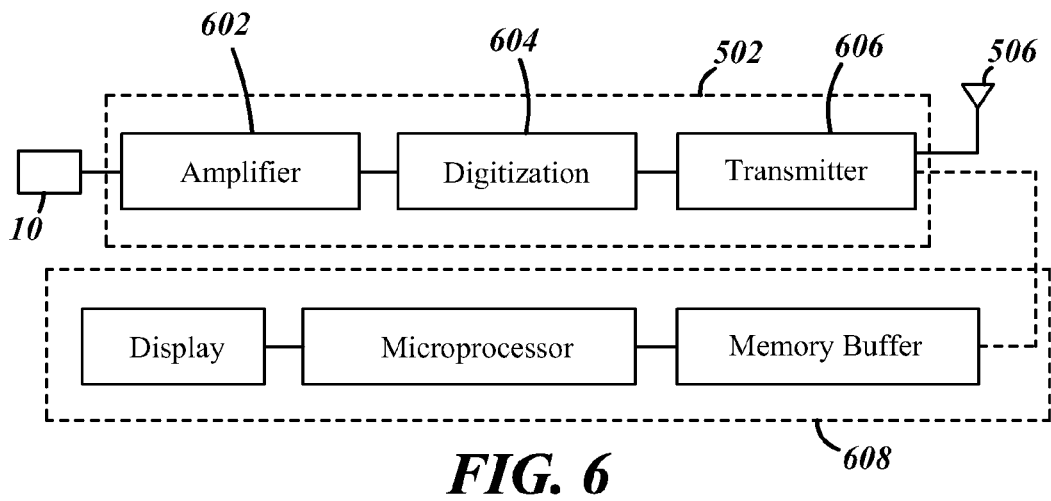
FIG. 6 is a block diagram of an exemplary embodiment of a system in which a sensor using a carbon-based element is used.

Turning to FIG. 6, a block diagram is shown of a system 600 in which the sensor 10 provides signals to a microcontroller 502, which then communicates those signals to a receiving portion of the system 600. The microcontroller 502 can include an amplifier 602, an analog/digital converter 604, and a transmitter 606. The microcontroller 502 can receive signals from the sensor 10 and pass them through the amplifier 602. In one implementation, the signals can be amplified to 4-20 mA and passed to the analog/digital converter 604. Once converted to digital signals, the signals are communicated to a remote location using the transmitter 606 and the antenna 506. The signals can be communicated to a receiving device 608 either wirelessly or by wire. The receiving device 608 can include a microprocessor, a memory buffer, and a display. In one implementation, the receiving device 608 is a personal or handheld computer that wirelessly receives the signals via short-range communication techniques. In another embodiment, the microcontroller 502 and the receiving device are included in a single device.

Figure 7:
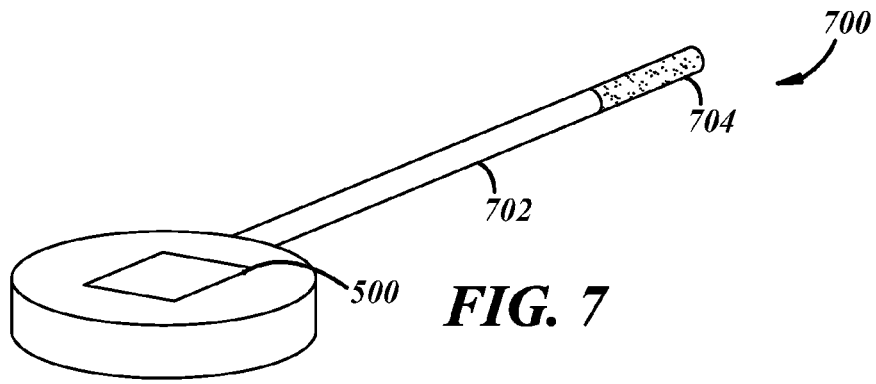
FIG. 7 is a perspective view of an exemplary embodiment of an apparatus carrying the monitoring device.

Turning to FIG. 7, a perspective view is shown of an exemplary embodiment of an apparatus 700 carrying the monitoring device 500. The apparatus 700 can take a variety of forms yet in the form shown it includes an extended rod 702 with a handle 704 located distally from the monitoring device 500. In this embodiment, the apparatus 500 can permit a user to deploy the monitoring device 500 into an environment by hand. The extended rod 702 can include a telescoping feature allowing the user to control the distance between the handle 704 and the monitoring device 500.

Figure 8:
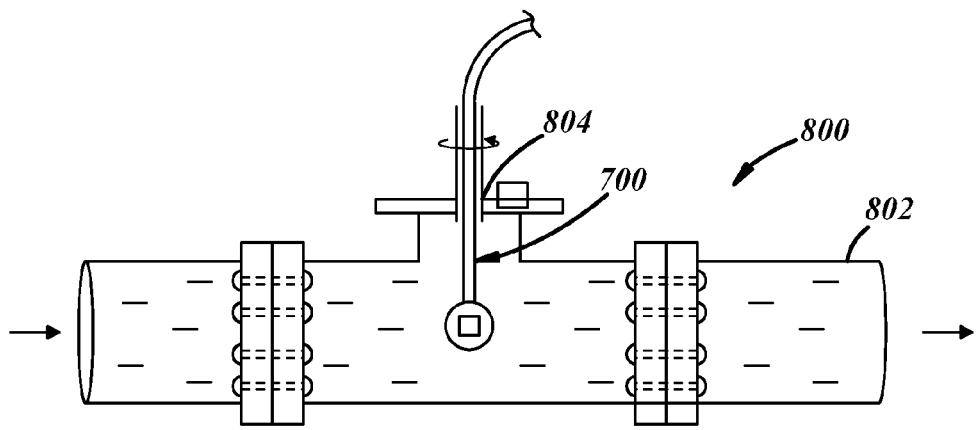
FIG. 8 is a cross-sectional view of an exemplary environment in which the apparatus can be used.

Turning now to FIG. 8, a profile cross-sectional view is shown of an exemplary environment 800 in which the apparatus 700 can be used. The environment 800 includes a cross-section of a pipe 802 through which fluid flows. The monitoring device 500 used with the apparatus 700 can be placed into the pipe 802 through an access opening 804. The monitoring device 500 is shown to be manipulated so that the flow of fluid in the pipe 802 passes parallel to the surface of the carbon-based element 12 of the sensor 10. When in this position, a user can measure the rate of fluid flow through the pipe 802. The monitoring device 500 can also be used to measure the pressure of fluid flow in the pipe 802. To do so, the user can rotate the monitoring device 500 ninety degrees via the extended rod 702 so that the flow of fluid in the pipe 802 is perpendicular to the surface of the carbon-based element 12 of the sensor 10.

Figure 9:
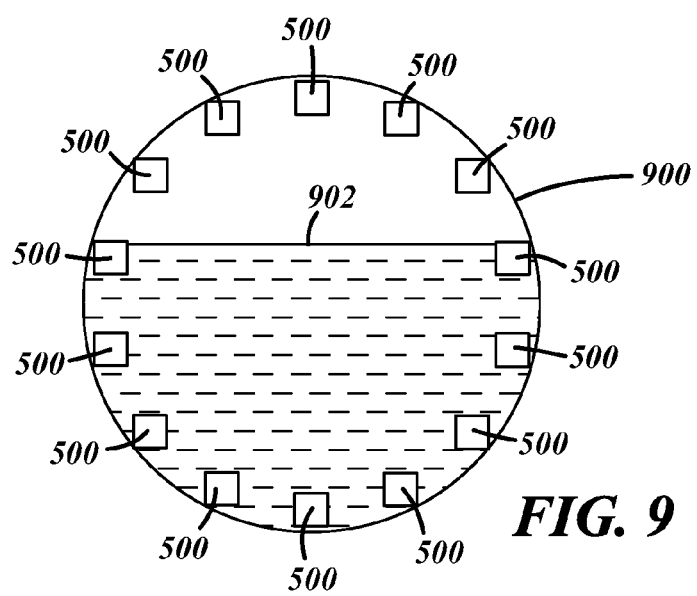
FIG. 9 is a cross-sectional view of a pipe in which a plurality of monitoring devices are used.

Turning to FIG. 9, a cross-section of a partially fluid-filled pipe 900 is shown with a plurality of monitoring devices 500 located around the inside circumference of the pipe 900. A fluid level 902 may vary as fluid flows through the pipe 900. In this implementation, some monitoring devices 500 may contact the fluid while others may not. Locating the plurality of monitoring devices 500 around the inside circumference of the pipe 900 can ensure that at least one device 500 can monitor the fluid in the pipe 900.

Figure 10:
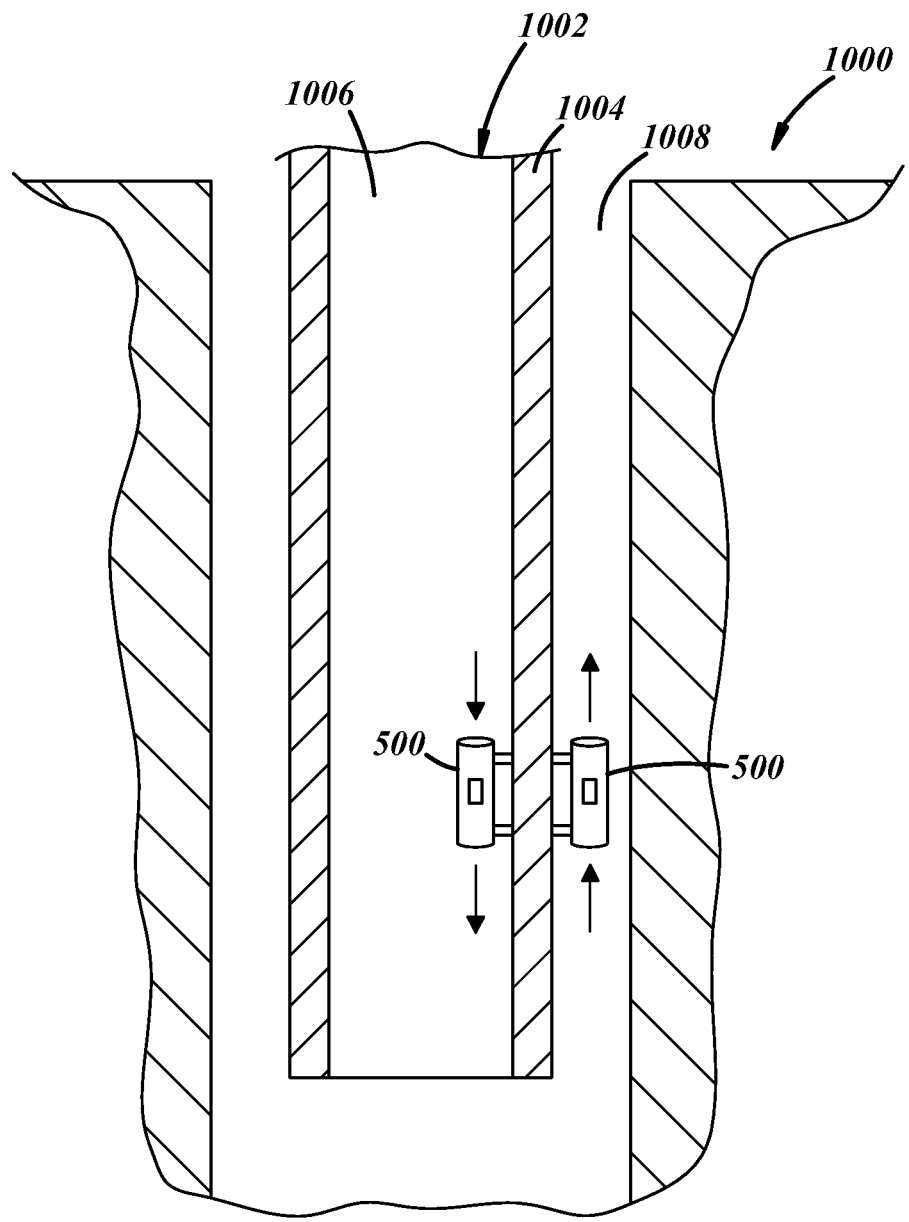
FIG. 10 is a cross-sectional view of a well in which monitoring devices are used.

FIG. 10 depicts a cross-section of a well 1000 that is being bored by a drill apparatus 1002. The well 100 can be a shaft that has or is being bored into the earth, such as can be created during natural resource exploration. The drill apparatus 1002 can include a cutting head (not shown) and a hollow cutting shaft 1004 that drives the cutting head. Both pressure and torsional force can be exerted on the cutting shaft 1004 as the cutting head bores through earth. As part of the boring process, a synthetic fluid can flow downward through the interior 1006 of cutting shaft 1004 to lubricate the cutting head and/or remove debris created during cutting. As cutting proceeds, debris can be suspended in the synthetic fluid and flow upward through an exterior 1008 of the cutting shaft 1004 between the exterior 1008 and a wall 1010 of the well 1000. Separate monitoring devices 500 can be placed in the interior 1006 and exterior 1008 of the cutting shaft 1004. The monitoring device 500 is capable of detecting the downward flow of the synthetic fluid through the hollow cutting shaft 1004 as well as the pressure exerted on the sensor 10 of the monitoring device 500. The monitoring device 500 is capable of detecting the upward flow of the synthetic fluid through the exterior 1008 of the hollow cutting shaft 1004 as well as the pressure exerted on the sensor 10 of the monitoring device 500.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A sensor using a carbon-based element for measuring a flow or a pressure in an environment, comprising:
   a substrate;
   a carbon-based element comprising carbon nanotubes; and
   one or more electrodes electrically communicating with the carbon based element, wherein the electrodes are located between the substrate and the carbon-based element so that the electrodes are not exposed to the environment.

2. The sensor of claim 1, further comprising a potting compound that separates the one or more electrodes from the environment and exposes a portion of the carbon-based element.

3. The sensor of claim 1, further comprising a first electrical lead and a second electrical lead.

4. The sensor of claim 1, wherein the carbon-based element comprises graphene.

5. The sensor of claim 1, further comprising a microprocessor detecting changes or amounts of voltage, current, or both measured across the carbon-based element.

6. The sensor of claim 5, further comprising an antenna capable of short-range wireless communications, cellular communications, or both.

7. The sensor of claim 5, further comprising a housing that surrounds the microprocessor and at least a portion of the sensor.

8. A sensor using a carbon-based element for measuring a flow or a pressure in an environment, comprising:
   a substrate;
   a carbon-based element comprising carbon nanotubes;
   one or more electrodes electrically communicating with the carbon-based element, wherein the electrodes are located between the substrate and the carbon-based element; and
   a nanoparticle layer having hydrophobic or oil-phobic properties, wherein the nanoparticle layer separates the carbon-based element from the environment.

9. The sensor of claim 8, further comprising a first electrical lead and a second electrical lead.

10. The sensor of claim 8, wherein the carbon-based element comprises graphene.

11. The sensor of claim 8, further comprising a microprocessor detecting changes or amounts of voltage, current, or both measured across the carbon-based element.

12. The sensor of claim 11, further comprising an antenna capable of short-range wireless communications, cellular communications, or both.

13. The sensor of claim 11, further comprising a housing that surrounds the microprocessor and at least a portion of the sensor.

14. The sensor of claim 11, wherein the microprocessor is calibrated to compensate for a change in voltage output or a change in current output of the sensor caused by the nanoparticle layer.

* * * * *